(12) United States Patent
Merrill

(10) Patent No.: US 10,914,402 B2
(45) Date of Patent: Feb. 9, 2021

(54) SHUTTLE VALVE WITH DAMPING

(71) Applicant: The Boeing Company, Chicago, IL (US)

(72) Inventor: Ian Stuart Merrill, Seal Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/424,837

(22) Filed: May 29, 2019

(65) Prior Publication Data

US 2019/0277427 A1 Sep. 12, 2019

Related U.S. Application Data

(63) Continuation of application No. 15/437,682, filed on Feb. 21, 2017, now Pat. No. 10,344,890.

(51) Int. Cl.

| *F16K 21/10* | (2006.01) |
|---|---|
| *F16K 47/04* | (2006.01) |
| *B60T 8/00* | (2006.01) |
| *B60T 8/17* | (2006.01) |
| *B60T 13/68* | (2006.01) |

(Continued)

(52) U.S. Cl.
CPC ............. *F16K 47/04* (2013.01); *B60T 8/00* (2013.01); *B60T 8/17* (2013.01); *B60T 13/686* (2013.01); *B64C 25/42* (2013.01); *B64C 25/44* (2013.01); *F15B 13/028* (2013.01); *F15B 13/0407* (2013.01); *F16K 3/243* (2013.01); *F16K 11/07* (2013.01); *B60T 17/04* (2013.01); *F16K 11/044* (2013.01)

(58) Field of Classification Search
CPC .. F16K 11/044; F16K 47/04; Y10T 137/2567; Y10T 137/2569
See application file for complete search history.

(56) References Cited

U.S. PATENT DOCUMENTS 2,408,799 A ‡ 10/1946 Melichar ................. F15B 13/02
  137/113
2,440,478 A ‡ 4/1948 Kehle ..................... B64C 13/00
  137/113

(Continued)

OTHER PUBLICATIONS

Extended European Searh Report prepared by the European Patent Office in application No. 18 15 5050.0 dated Jul. 20, 2018.‡

*Primary Examiner* — Reinaldo Sanchez-Medina
(74) *Attorney, Agent, or Firm* — McDonnell Boehnen Hulbert & Berghoff LLP

(57) ABSTRACT

An example valve includes: (i) a valve body defining a first longitudinal bore therein and including a first inlet, a second inlet, and an outlet; (ii) a cage disposed in the first longitudinal bore coaxial with the valve body, where the cage defines a second longitudinal bore therein; (iii) a pin mounted and extending longitudinally within the second longitudinal bore at an end of the cage adjacent to the first inlet; and (iv) a spool shiftably mounted within the second longitudinal bore and configured to move axially therein to shift between a first position and a second position. The spool includes a blind hole formed at an end thereof facing the pin and coaxial therewith, such that as the spool shifts from the second position to the first position, a portion of the pin is received within the blind hole of the spool.

20 Claims, 6 Drawing Sheets

(51) Int. Cl.
*F15B 13/02* (2006.01)
*F15B 13/04* (2006.01)
*B64C 25/44* (2006.01)
*F16K 3/24* (2006.01)
*F16K 11/07* (2006.01)
*B64C 25/42* (2006.01)
*B60T 17/04* (2006.01)
*F16K 11/044* (2006.01)

(56) References Cited

U.S. PATENT DOCUMENTS

| | | | | |
|---|---|---|---|---|
| 2,641,273 A | * | 6/1953 | Siebens | F17C 13/045 |
| | | | | 137/113 |
| 2,651,491 A | ‡ | 9/1953 | Ashton | F15B 13/02 |
| | | | | 137/112 |
| 2,654,564 A | ‡ | 10/1953 | Pech | F16K 31/56 |
| | | | | 137/112 |
| 2,685,296 A | ‡ | 8/1954 | Boosman | F16K 11/044 |
| | | | | 137/112 |
| 2,966,920 A | * | 1/1961 | Oglesby | F17C 13/045 |
| | | | | 137/113 |
| 3,533,431 A | ‡ | 10/1970 | Kuenzel | F16K 11/044 |
| | | | | 137/11 |
| 3,550,611 A | ‡ | 12/1970 | Baatrup | F15B 13/00 |
| | | | | 137/111 |
| 3,633,606 A | ‡ | 1/1972 | Hay | F16K 11/065 |
| | | | | 137/113 |
| 4,056,126 A | ‡ | 11/1977 | Hauser | F16K 31/0613 |
| | | | | 137/625.65 |
| 6,257,268 B1 | ‡ | 7/2001 | Hope | G05D 16/103 |
| | | | | 137/111 |
| 8,132,588 B1 | ‡ | 3/2012 | Langenfeld | F16K 11/048 |
| | | | | 137/100 |
| 9,719,600 B2 | ‡ | 8/2017 | Patterson | F16K 11/044 |
| 2005/0028864 A1 | ‡ | 2/2005 | Thrash, Jr. | F16K 3/265 |
| | | | | 137/11 |
| 2010/0154896 A1 | ‡ | 6/2010 | Thrash, Jr. | F16K 11/044 |
| | | | | 137/112 |
| 2013/0037736 A1 | ‡ | 2/2013 | Bresnahan | F16K 11/044 |
| | | | | 251/279 |

\* cited by examiner
‡ imported from a related application

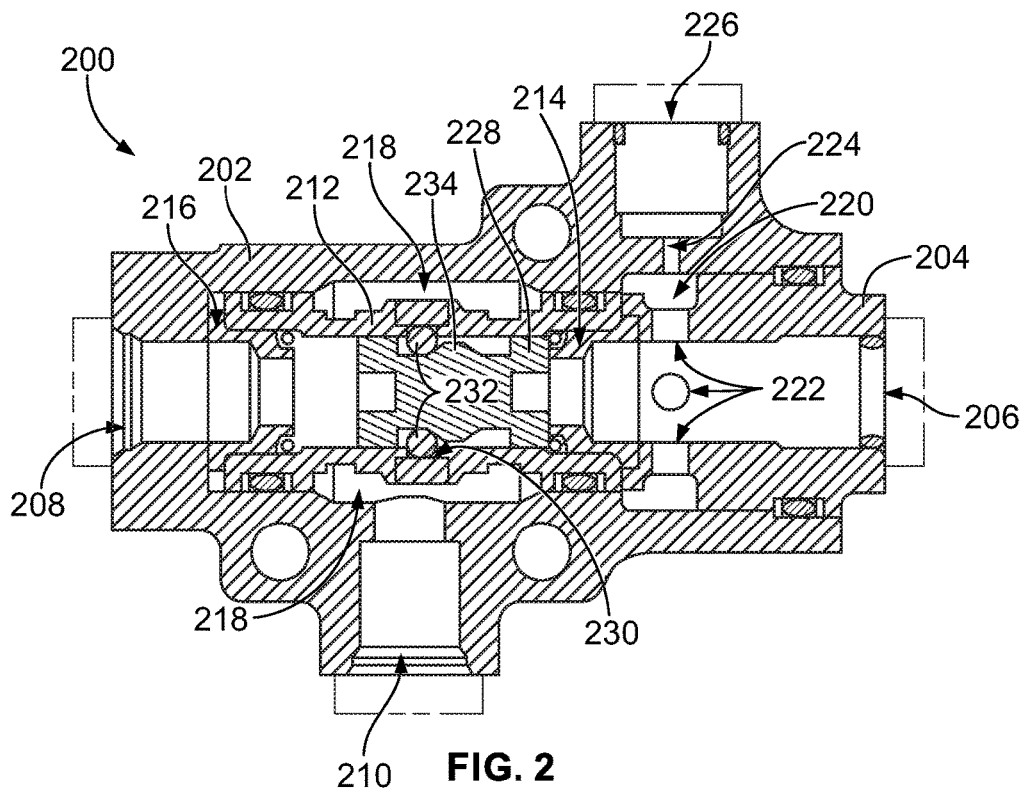
FIG. 2
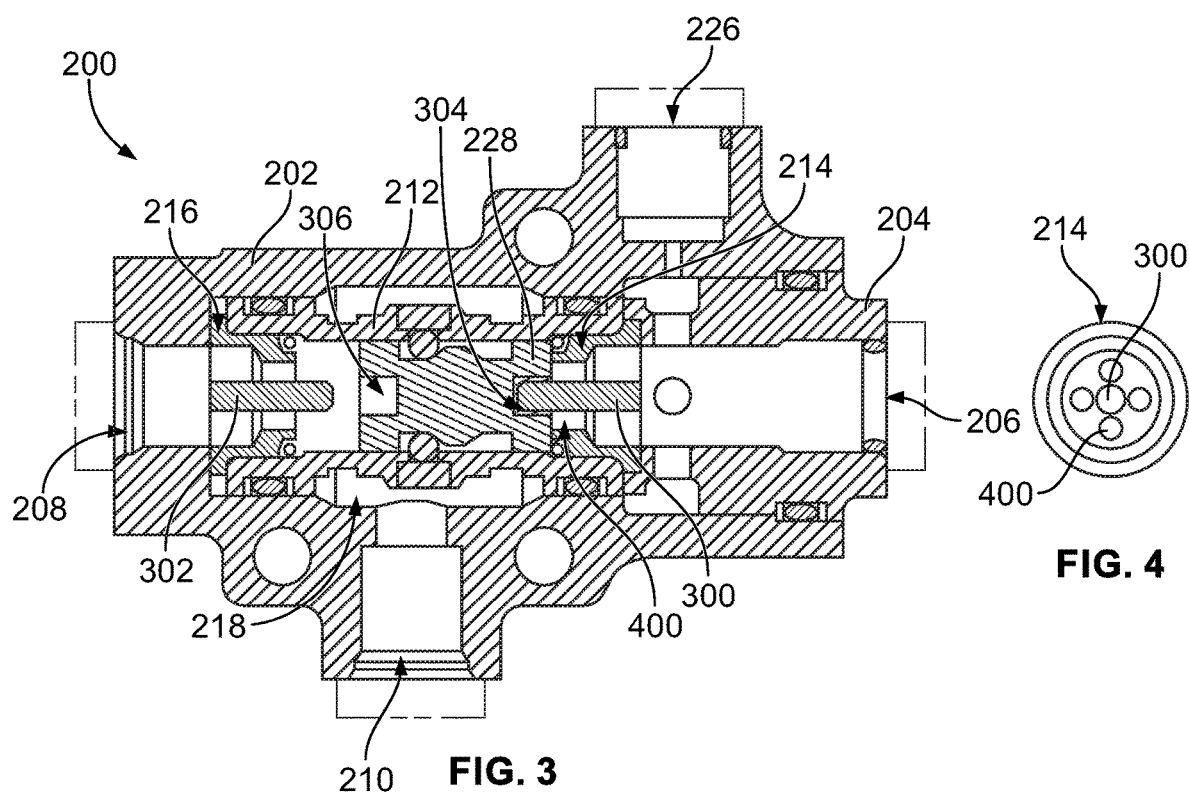
FIG. 3
FIG. 4

SHUTTLE VALVE WITH DAMPING

CROSS REFERENCE TO RELATED APPLICATION

The present application is a continuation of U.S. patent application Ser. No. 15/437,682, filed on Feb. 21, 2017, the entire contents of which are herein incorporated by reference as if fully set forth in this description.

FIELD

The present disclosure relates generally to a shuttle valve with damping features.

BACKGROUND

A shuttle valve is a type of valve that allows fluid to flow therethrough from one of two fluid sources. Shuttle valves are used in pneumatic and hydraulic systems.

A shuttle valve may have a valve body defining three openings that represent a first inlet, a second inlet, and an outlet. A valve element moves freely within the valve body. When pressure from a fluid is exerted through a particular inlet, it pushes the valve element towards the opposite inlet. This movement may block the opposite inlet, while allowing the fluid to flow from the particular inlet to the outlet. This way, two different fluid sources can provide pressurized fluid to an outlet without back flow from one source to the other.

Further, when the valve element is pushed due to application of pressure from the particular inlet, the valve element may travel rapidly toward the other inlet. Such rapid movement may communicate high pressure fluid from the particular inlet to the outlet in a short period of time, thus causing pressure spike or a shock wave to travel downstream from the outlet. The shock wave may cause damage to components and lines disposed downstream from the outlet such as hoses, pressure sensors, other valves, etc.

Therefore, it may be desirable to have a shuttle valve with features that damp motion of the valve element so as to eliminate or mitigate the intensity of the pressure spike or shock wave travelling downstream from the outlet. Damping the movement of the valve element within the shuttle valve may improve the dynamics of an associated hydraulic or pneumatic system by reducing the pressure spikes caused when the shuttle valve switches from one source to the other. Such damping may prevent damage to fittings, sensors, seals, etc., and may also prevent erratic behavior of certain systems.

SUMMARY

The present disclosure describes implementations that relate to a shuttle valve with damping. In a first example implementation, the present disclosure describes a shuttle valve. The shuttle valve includes: (i) a valve body defining a first longitudinal bore therein, where the valve body includes a first inlet, a second inlet, and an outlet; (ii) a cage disposed in the first longitudinal bore coaxial with the valve body, where the cage defines a second longitudinal bore therein, where the outlet is fluidly coupled to an annular area formed between an exterior peripheral surface of the cage and an interior peripheral surface of the valve body; (iii) a pin mounted and extending longitudinally within the second longitudinal bore at an end of the cage adjacent to the first inlet; and (iv) a spool shiftably mounted within the second longitudinal bore and configured to move axially therein to shift between: (a) a first position adjacent to the first inlet, where at the first position the spool blocks the first inlet while allowing pressurized fluid to flow from the second inlet to the annular area and the outlet, and (b) a second position adjacent to the second inlet, where at the second position the spool blocks the second inlet while allowing pressurized fluid to flow from the first inlet to the annular area and the outlet. The spool includes a blind hole formed at an end thereof facing the pin and coaxial therewith, such that as the spool shifts from the second position to the first position, a portion of the pin is received within the blind hole of the spool.

In a second example implementation, the present disclosure describes a valve. The valve includes: (i) a valve body defining a first longitudinal bore therein, where the valve body includes a first inlet, a second inlet, and an outlet; (ii) a cage disposed in the first longitudinal bore coaxial with the valve body, where the cage defines a second longitudinal bore therein; (iii) a first pin mounted and extending longitudinally within the second longitudinal bore at a first end of the cage adjacent to the first inlet; (iv) a second pin mounted and extending longitudinally within the second longitudinal bore at a second end of the cage adjacent to the second inlet; and (v) a spool shiftably mounted within the second longitudinal bore and configured to move axially therein to shift between: (a) a first position adjacent to the first inlet, where at the first position the spool blocks the first inlet while allowing pressurized fluid to flow from the second inlet to the outlet, and (b) a second position adjacent to the second inlet, where at the second position the spool blocks the second inlet while allowing pressurized fluid to flow from the first inlet to the outlet. The spool includes a first blind hole formed at a first end thereof facing the first pin and coaxial therewith, such that as the spool shifts from the second position to the first position, a portion of the first pin is received within the first blind hole of the spool. The spool also includes a second blind hole formed at a second end thereof facing the second pin and coaxial therewith, such that as the spool shifts from the second position to the first position, a portion of the second pin is received within the second blind hole of the spool.

In a third example implementation, the present disclosure describes a method for damping a shuttle valve. The method includes mounting a pin within a longitudinal bore defined by a cage at an end of the cage adjacent to a first inlet of the shuttle valve, such that the pin extends longitudinally within the longitudinal bore defined by the cage. The shuttle valve includes a valve body defining a respective longitudinal bore therein, where the valve body comprises the first inlet, a second inlet, and an outlet, and where the cage is disposed in the respective longitudinal bore coaxial with the valve body. The shuttle valve also includes a spool shiftably mounted within the longitudinal bore of the cage and configured to move axially therein to shift between: (i) a first position adjacent to the first inlet, where at the first position the spool blocks the first inlet while allowing pressurized fluid to flow from the second inlet to the outlet, and (ii) a second position adjacent to the second inlet, where at the second position the spool blocks the second inlet while allowing pressurized fluid to flow from the first inlet to the outlet. The method also includes forming a blind hole at an end of the spool facing the pin and coaxial therewith, such that as the spool shifts from the second position to the first position, a portion of the pin is received within the blind hole of the spool.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 2 illustrates a cross section of a valve, in accordance with an example implementation.

FIG. 3 illustrates the valve shown in FIG. 2 with damping features, in accordance with another example implementation.

FIG. 4 illustrates a front view of an end cap, in accordance with another example implementation.

DETAILED DESCRIPTION

Example shuttle valves are configured to receive flow from two different sources and divert the fluid with the higher pressure to an outlet port. Shuttle valves are used in many systems and circuits such as load sensing and brake circuits. A brake circuit of an aircraft is described below as an example to illustrate use and operation of a shuttle valve. However, the shuttle valve described herein could be used in any other hydraulic or pneumatic circuit.

Figure 1:
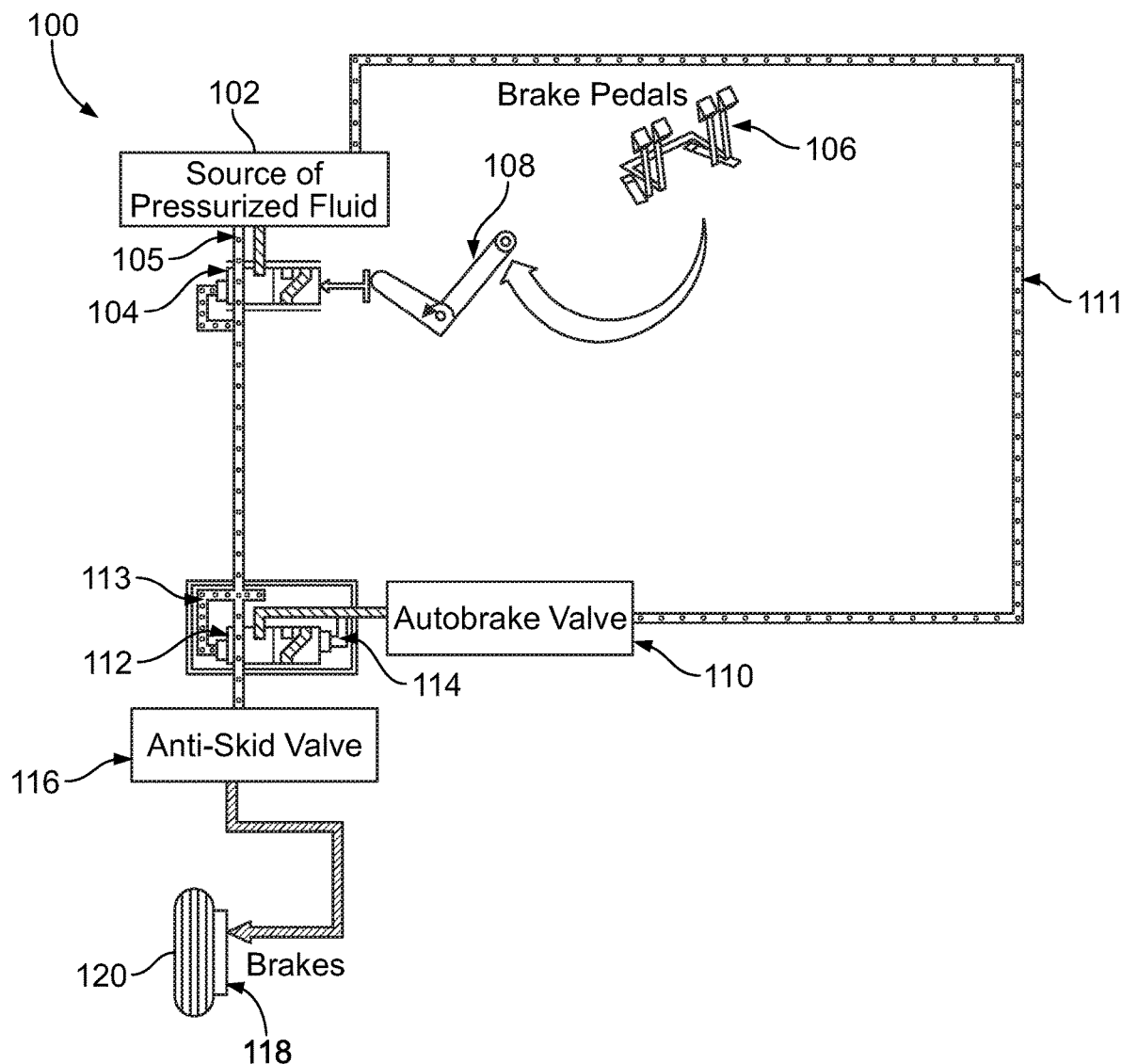
FIG. 1 illustrates a block diagram of a partial hydraulic system for a brake system of an aircraft, in accordance with an example implementation.

FIG. 1 illustrates a block diagram of a partial hydraulic system 100 for a brake system of an aircraft, in accordance with an example implementation. The hydraulic system 100 includes a source 102 of pressurized fluid. The source 102 could be a prime mover, a pump, an accumulator, or a combination thereof. In examples, the hydraulic system 100 may include multiple sources of pressurized fluid (e.g., a pump and an accumulator or multiple pumps or accumulators). A controller of the hydraulic system 100 may select which source of the multiple sources to provide pressurized fluid to the brake system based on various sensor inputs.

The source 102 may be coupled to a reservoir or tank that includes fluid at a low pressure. The source 102 may be configured to draw fluid from the reservoir and pressurize the fluid to provide it to the other components of the hydraulic system 100. The reservoir is not shown to reduce visual clutter in the drawing.

The hydraulic system 100 includes a brake metering valve 104 fluidly coupled to the source 102. For instance, an inlet of the valve 104 could be coupled to the source 102 via a hydraulic line 105.

The valve 104 could be mechanically, hydraulically, or electronically actuatable. As an example for illustration, a pilot of the aircraft may use brake pedals 106 to actuate a lever mechanism 108 that actuates the valve 104 to apply manual brakes. In an example, the brake pedals 106 could be coupled to brake cables that actuate the lever mechanism 108. In another example, the brake pedals 106 could be coupled to a position sensor that indicates the position of the brake pedals 106 to the controller of the brake system. The controller may accordingly actuate an electric motor to move the lever mechanism 108 and actuate the valve 104. Other actuation mechanisms are possible.

In examples, the valve 104 could be any type of valve such as a spool valve or a poppet valve, and may be a two-way, three-way, or four-way valve. Further, the valve 104 may be directly operated or pilot operated. For example, if the valve 104 is directly operated, the lever mechanism 108 may directly actuate a spool of the valve 104. In another example, if the valve 104 is pilot operated, the lever mechanism 108 may actuate a pilot valve that controls a small amount of fluid that actuates a main spool of the valve 104.

In examples, the valve 104 may be a proportional valve where an actuating member or signal controls the stroking of a movable element (e.g., a spool) within the valve 104 over metering ports. Varying the stroke of the movable element produces a variable flow and pressure of fluid at an outlet of the valve 104. Such variable flow and pressure enables applying varying degrees of braking based on an extent of motion of the brake pedals 106.

The hydraulic system 100 also includes an autobrake valve 110 fluidly coupled to the source 102. For instance, an inlet of the valve 110 could be coupled to the source 102 via a hydraulic line 111.

The valve 110 could be mechanically, hydraulically, or electronically actuatable and could include any type of spool, poppet, two-way, three-way, or four-way valve. The valve 110 may be a proportional valve or an on-off valve. The valve 110 may be automatically actuated by the controller of the brake system under particular conditions. For example, the valve 110 may be normally closed, and the controller may be configured to detect landing of the aircraft and send a signal to actuate the valve 110 upon landing.

The hydraulic system 100 also includes a shuttle valve 112. An outlet of the valve 104 may be fluidly coupled to a first inlet of the shuttle valve 112 via hydraulic line 113. Also, an outlet of the valve 110 may be fluidly coupled to a second inlet of the shuttle valve 112 via hydraulic line 114. In examples, the shuttle valve 112 may include a movable element (e.g., a spool) therein that shifts between two positions based on which pressure level is higher at the first and second inlets of the shuttle valve 112. The shuttle valve 112 may then allow fluid provided by either the valve 104 or the valve 110 to flow to an outlet of the shuttle valve 112 based on the respective pressure levels of the fluid at the first and second inlets thereof.

In an example, a pressure level of the fluid provided by the valve 104 via the hydraulic line 113 may be higher than a respective pressure level of the fluid provided by the valve 110 via the hydraulic line 114. In this example, the movable element within the shuttle valve 112 shifts to allow the fluid received via the hydraulic line 113 to flow to the outlet of the shuttle valve 112 and then flow downstream from the shuttle valve 112.

In another example, a pressure level of the fluid provided by the valve 104 via the hydraulic line 113 may be less than a respective pressure level of the fluid provided by the valve 110 via the hydraulic line 114. In this example, the movable element within the shuttle valve 112 shifts to allow the fluid received via the hydraulic line 114 to flow to the outlet of the shuttle valve 112 and then flow downstream from the shuttle valve 112. Therefore, the shuttle valve 112 may effectively operate as a selector of whether to provide fluid from the valve 104 or fluid from the valve 110 downstream from the shuttle valve 112.

The fluid flowing from the outlet of the shuttle valve 112 is then provided to other valves, such as an anti-skid valve 116. From the valve 116, the fluid is provided to a brake actuator 118. The brake actuator 118 may, include for example, a hydraulic cylinder and a piston. The piston may be coupled to brake pads disposed adjacent to an aircraft wheel 120. When pressurized fluid is received at the brake actuator 118, the piston may move, thereby pushing the brake pads to frictionally interact with the aircraft wheel 120 to reduce a speed of the aircraft. The anti-skid valve 116 may be configured to temporarily release pressure of fluid flowing from the shuttle valve 112 when the controller detects that the aircraft wheel 120 is skidding.

In examples, during normal operation, when brakes are not commanded to be actuated, both valves 104 and 110 may be closed. In other examples, when the valve 104 is actuated via the brake pedals 106 to apply the manual brakes while the valve 110 is closed, the shuttle valve 112 may be configured to select the fluid provided by the hydraulic line 113 from the valve 104 to flow downstream from the shuttle valve 112.

However, some events may cause the valve 110 to be actuated. For example, when the aircraft lands, the controller may actuate the valve 110 to engage the brake actuator 118 with the aircraft wheel 120 automatically upon detecting landing without the pilot actuating the brake pedals 106. As a result of actuating the valve 110, high pressure fluid is suddenly provided to the shuttle valve 112. The high pressure fluid then causes the movable element in the shuttle valve 112 to shift rapidly to block fluid from the valve 104 and allow fluid flow from the valve 110 to flow downstream. The Rapid shift of the movable element may cause a corresponding surge in in pressure and possibly a shock wave downstream from the shuttle valve 112.

The surge in pressure and the shock wave may cause damage to components downstream from the shuttle valve 112 such as fittings, seals, sensors, other valves, etc. Further, the surge in pressure and the shock wave may take place in a short period of time, and thus the controller might not detect them. Due to the lack of detection of the surge in pressure or the shock wave, the controller might not respond to protect the components disposed downstream from the shuttle valve 112.

Disclosed herein are example shuttle valves with a configuration that damps motion of the movable element within a shuttle valve as it moves from one side to the other side of the shuttle valve. The disclosed damping features may mitigate the pressure surge created as a result of rapid motion of the movable element and the associated shock wave transmitted downstream thereof. Thus, the damping features may protect the components disposed downstream from the shuttle valve against damage and deterioration.

FIG. 2 illustrates a cross section of a valve 200, in accordance with an example implementation. The valve 200 could represent, for example, the shuttle valve 112. The valve 200 has a valve body 202 that defines a longitudinal cylindrical cavity or bore therein. The longitudinal cylindrical bore may define several stepped surfaces to receive valve components therein and provide for supporting surfaces.

For example, the longitudinal cylindrical bore of the valve body 202 may be configured to receive a retainer 204 coaxial with the valve body 202 and disposed at a first end of the valve body 202. The retainer 204 includes a first inlet port 206 that may be configured to receive pressurized fluid from a first source of pressurized fluid (e.g., fluid from the outlet of the valve 104). A second end of the valve body may include a second inlet port 208 that may be configured to receive pressurized fluid from a second source of pressurized fluid (e.g., fluid from the outlet of the valve 110).

In examples, as shown in FIG. 2, the second inlet port 208 may be coaxial with and mounted opposite to the first inlet port 206. However, in other examples, the first and second inlet ports 206 and 208 might not be coaxial or mounted opposite to each other. The valve body 202 further defines an outlet port 210. In examples, as shown in FIG. 2, the outlet port 210 may be transverse to both the first and second inlet ports 206 and 208. However, in other examples, the outlet port 210 might not be transverse to the inlet ports 206 and 208. Thus, the inlet ports 206 and 208 and the outlet port 210 could be configured differently, and the configuration shown in FIG. 2 is an example for illustration only.

The valve 200 also includes a cage 212 disposed in the longitudinal cylindrical bore of the valve body 202. The cage 212 is mounted coaxial with the valve body 202 and the retainer 204, and is disposed longitudinally adjacent to the retainer 204 in the longitudinal cylindrical bore within the valve body 202.

A first end cap 214 is disposed at a first end of the cage 212 coaxial with the cage 212 and the retainer 204. As shown, the first end cap 214 interfaces with, and is retained between, both the retainer 204 and the cage 212. In examples, the first end cap 214 is cylindrical with stepped exterior and interior surfaces as shown in FIG. 2. With this configuration, the cage 212 is secured against the retainer 204 and the first end cap 214 at the first end of the cage 212.

A second end cap 216 is disposed at a second end of the cage 212 opposite the first end thereof. The second end cap 216 is coaxial with the cage 212 and the valve body 202. As shown, the second end cap 216 interfaces with, and is retained between, an interior surface of the valve body 202 and the second end of the cage 212. In examples, the second end cap 216 is cylindrical with stepped exterior and interior surfaces as shown in FIG. 2. With this configuration, the cage 212 is secured against the second end cap 216 at the second end of the cage 212.

As shown in FIG. 2, an annular area 218 is formed between an exterior peripheral surface of the cage 212 and an interior peripheral surface of the valve body 202. With this configuration, the annular area 218 is fluidly coupled to the outlet port 210.

Further, the retainer 204 may include an annular groove 220 on an exterior peripheral surface thereof. Pressurized fluid provided to the first inlet port 206 may be communicated through holes 222 in the retainer 204 to the annular groove 220. The annular groove 220 may be configured to communicate the pressurized fluid through a channel or orifice 224 to a port 226. A pressure sensor may be coupled to the port 226 to measure a pressure level at the first inlet port 206, for example. The orifice 224 may damp any pressure spikes at the first inlet port 206 to protect the pressure sensor coupled to the port 226.

The cage 212 defines a longitudinal cylindrical bore that accommodates the end caps 214 and 216, where both end caps 214 and 216 extend within the longitudinal cylindrical bore of the cage 212. A spool 228 is disposed in the longitudinal cylindrical bore defined within the cage 212, coaxial with the valve body 202 and the cage 212. The spool 228 is shiftably mounted within the cage 212 and is configured to move axially in the longitudinal cylindrical bore defined within the cage 212.

If a pressure level of the pressurized fluid provided by the second source to the second inlet port 208 is higher than a respective pressure level of the pressurized fluid provided by the first source to the first inlet port 206, the spool 228 shifts toward the first inlet port 206 (e.g., to the right in FIG. 2). The spool 228 travels axially within the longitudinal cylindrical bore defined by the cage 212 until the spool 228 reaches a position where the spool 228 rests against the first end cap 214. At this position, fluid provided to the first inlet port 206 is blocked from flowing to either the second inlet port 208 or the outlet port 210. However, pressurized fluid provided to the second inlet port 208 is communicated to the annular area 218 and from the annular area 218 to the outlet port 210. This position of the spool 228 may be referred to as a first position.

If a pressure level of the pressurized fluid provided by the first source to the first inlet port 206 is higher than a respective pressure level of the pressurized fluid provided by the second source to the second inlet 208, the spool 228 shifts toward the second inlet port 208. The spool 228 may thus travel axially within the longitudinal cylindrical bore defined by the cage 212 until the spool 228 reaches a second position where it rests against the second end cap 216. At this position, fluid provided to the second inlet port 208 is blocked from flowing to either the first inlet port 206 or the outlet port 210. However, pressurized fluid provided to the first inlet port 206 is communicated to the annular area 218 and from the annular area 218 to the outlet port 210. In this manner, the spool 228 may shift between the first and second positions based on the pressure level at the first and second inlet ports 206 and 208.

In examples, the cage 212 may include a groove 230 disposed on an interior peripheral surface of the cage 212. A plurality of balls such as balls 232 may be disposed in the groove 230. The balls 232 may be mounted within the groove 230 and coupled or attached to the groove 230 via respective springs or other types of elastic elements. Two balls 232 are shown in FIG. 2 as an example for illustration, and more or fewer balls could be used.

The spool 228 may include a circumferential ridge 234 disposed on an exterior peripheral surface of the spool 228 and configured to interact with the balls 232. Particularly, the interaction between the balls 232 that are spring-loaded and the circumferential ridge 234 facilitates retaining the spool 228 at either the first or second position. For instance, in FIG. 2, the spool 228 is shown in the first position resting against the first end cap 214. The circumferential ridge 234 rests against the balls 232 to secure the spool 228 in the first position.

During operation of the hydraulic system including the valve 200, the pressure level of the pressurized fluid provided to the first inlet port 206 may rise to a pressure level that is higher than the respective pressure level at the second inlet port 208. If a difference in pressure levels is sufficiently high (e.g., 40-50 pounds per square inch pressure difference) to overcome the force of the springs pushing against the balls 232, the circumferential ridge 234 of the spool 228 may push the balls 232 in the groove 230 and the spool 228 is allowed to shift to the second position.

With this configuration, the spool 228 may shift between the first and second positions depending on the pressure levels at the inlet ports 206 and 208. A pressure spike at either inlet may cause the spool 228 to shift rapidly from one end to the other, and the pressure spike may then be communicated to the outlet port 210 and a shock wave may be generated downstream from the outlet port 210. The pressure spike or shock wave are thus transmitted to components (e.g., valves, sensors, seals, fittings, hoses, pipes, etc.) disposed downstream from the outlet port 210. As a result, these downstream components may be damaged. Therefore, it may be desirable to damp the motion of the spool 228 as it shifts from the first position to the second position and vice versa so as to mitigate or eliminate the shock wave.

FIG. 3 illustrates the valve 200 with damping features, in accordance with an example implementation. As shown in FIG. 3, pin 300 and pin 302 are mounted, and extend longitudinally, within the longitudinal cylindrical bore of the cage 212. The pin 300 is mounted at the first end of the cage 212 where the end cap 214 is mounted adjacent to the first inlet port 206, whereas the pin 302 is mounted at the second end of the cage 212 where the end cap 216 is mounted adjacent to the second inlet port 208. Pins 300 and 302 could also be referred to as posts, rods, pegs, or dowels.

In examples, the pins 300 and 302 may be coupled to their respective end caps 214 and 216. For instance, the pin 300 may be an integral part of the end cap 214. FIG. 4 illustrates a front view of the end cap 214, in accordance with an example implementation. As illustrated in FIG. 4, the pin 300 may be integral with the end cap 214 and surround by holes such as hole 400 to allow flow of fluid through the end cap 214. The end cap 216 and the pin 302 may be configured similarly. However, in other examples, the pins 300 and 302 may be mounted to other components of the valve 200. For instance, the pins 300 and 302 may be mounted to or integral with the valve body 202 or the cage 212.

The spool 228 may have a first blind hole 304 at a first end thereof facing the pin 300 and may have a second blind hole 306 at a second end thereof opposite the first end and facing the pin 302. The first blind hole 304 is configured to be larger than the pin 300, and similarly, the second blind hole 306 is configured to be larger than the pin 302.

For example, the pin 300 could be cylindrical with a particular outer diameter, and the blind hole 304 could also be a cylindrical hole with an inner diameter larger than the particular outer diameter of the pin 300. The pin 302 and the blind hole may be configured similarly. However, in other examples, the pins 300 and 302 could be square in shape or have any other geometrical shapes, and the corresponding blind holes 304 and 306 could have a corresponding geometric shape, but are larger than the pins 300 and 302 to accommodate them. In other examples, the pins 300 and 302 could be mounted to the spool 228, whereas the blind holes 304 and 306 may be disposed in either the end caps 214 and 216.

During operation of the valve 200, the longitudinal cylindrical bore of the cage 212 is filled with fluid. Thus, the blind holes 304 and 306 may include fluid therein. When the spool 228 shifts from one position to another, a pin of the pins 300 and 302 longitudinally engages with a corresponding blind hole gradually.

As an example for illustration, the spool 228 may be in the second position blocking the second inlet port 208, and then a pressure level at the second inlet port 208 increases causing the spool 228 to shift from the second position to the first position shown in FIG. 3. As the spool 228 shifts from the second position to the first position shown in FIG. 3, the spool 228 first disengages from the pin 302 and travels to the right in FIG. 3 toward the pin 300.

As the spool 228 disengages from the pin 302, fluid may fill the blind hole 306. Further, as the spool 228 approaches the pin 300, the pin 300 is gradually inserted within the blind hole 304, thereby squeezing fluid disposed therein. The flow of the fluid in the space or clearance between the exterior surface of the pin 300 and the interior surface of the blind hole 304 may resist rapid movement of the spool 228 toward the first end cap 214. This resistance to the rapid movement of the spool 228 damps or slows down the spool 228.

With this configuration slamming the spool 228 into the first end cap 214 is avoided, and in contrast, the spool 228 impacts the first end cap 214 softly. Further, the gradual, slowed-down or damped motion of the spool 228 may preclude or mitigate transmitting pressure spikes or shock waves to the outlet port 210 and the components downstream therefrom.

Figure 5:
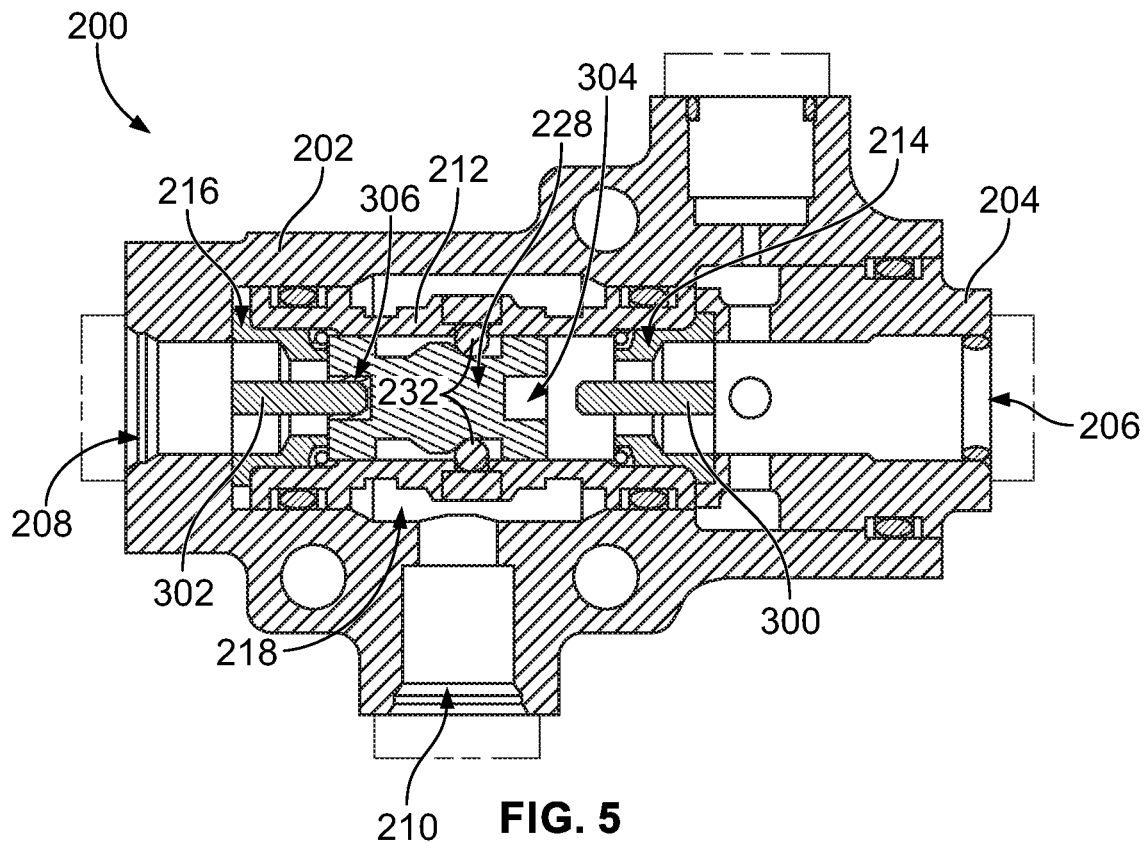
FIG. 5 illustrates the valve shown in FIG. 3 with a spool at a position blocking an inlet port, in accordance with an example implementation.
Figure 6:
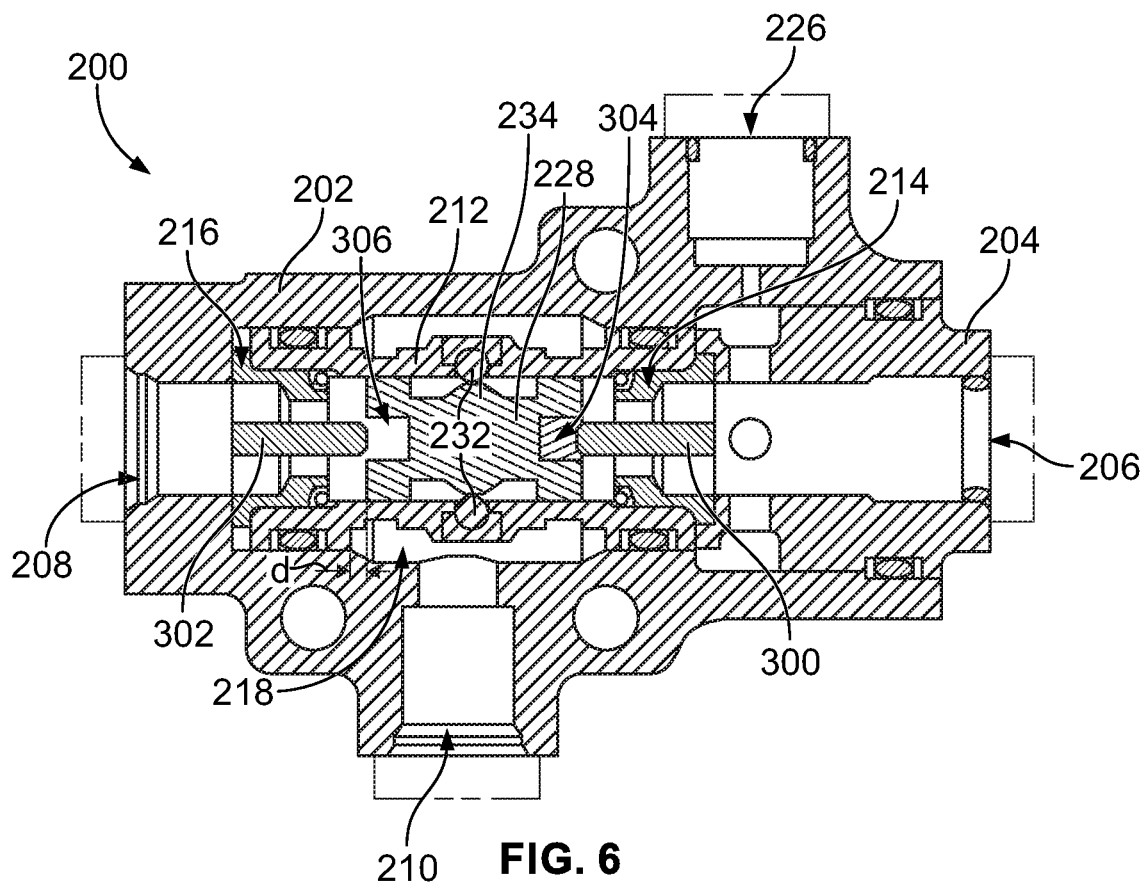
FIG. 6 illustrates the valve shown in FIG. 5 with the spool in transition from the position shown in FIG. 5 to another position, in accordance with an example implementation.
Figure 7:
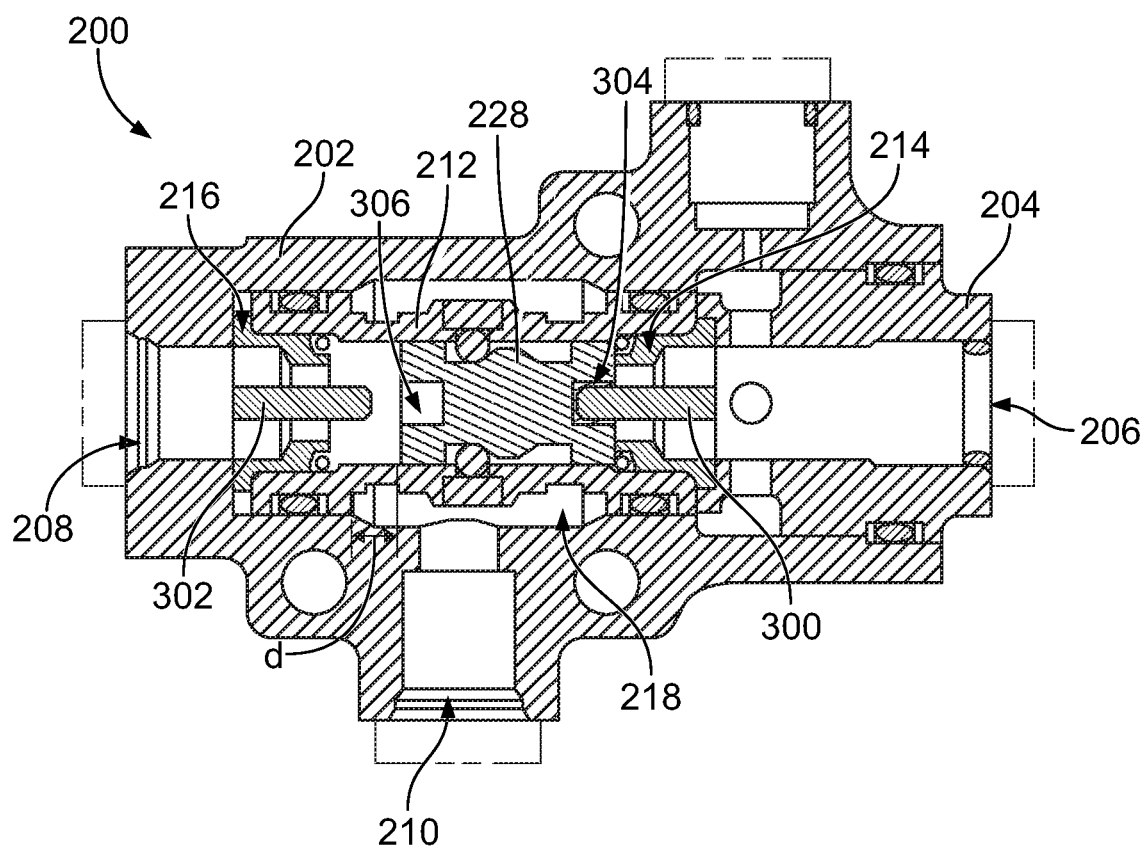
FIG. 7 illustrates the valve shown in FIG. 6 with the spool at the other position, in accordance with an example implementation.

FIGS. 5, 6, and 7 illustrate operation of the valve 200 as the spool 228 shifts from the second position to the first position, in accordance with an example implementation. Particularly, FIG. 5 illustrates the valve 200 with the spool 228 at the second position blocking the second inlet port 208, in accordance with an example implementation. The configuration of FIG. 5 results when the pressure level of pressurized fluid at the first inlet port 206 is higher than a respective pressure level of pressurized fluid at the second inlet port 208. As shown in FIG. 5, the pin 302 is inserted in the blind hole 306 and the pressurized fluid provided to the second inlet port 208 is blocked by the spool 228. The pin 300 is, however, disengaged from the blind hole 304, and the pressurized fluid received at the first inlet port 206 is allowed to flow to the annular area 218 and then to the outlet port 210.

If the pressure level at the second inlet port 208 becomes higher than the pressure level at the second inlet port 206 and the difference in pressure (e.g., 30-40 psi) overcomes the resistance of the balls 232, the spool 228 may shift toward the first position. FIG. 6 illustrates the valve 200 with the spool 228 in transition from the second position to the first position, in accordance with an example implementation. As shown in FIG. 6, the pressure difference between the inlet ports 206 and 208 causes the spool 228 to overcome the resistance of the balls 232 and the circumferential ridge 234 pushes the balls 232 in the annular groove 220.

At the position shown in FIG. 6, the spool 228, and specifically the blind hole 306, has disengaged from the pin 302, and fluid within the cage 212 refills the blind hole 306. A portion of the annular area 218 is now exposed to the fluid received at the second inlet port 208. The extent of the exposed portion is represented by the distance "d" shown in FIG. 6 between an edge of the annular area 218 and an edge of the spool 228. The exposed portion of the annular area 218 represents a restriction that the fluid received at the second inlet port 208 flows through before reaching the outlet port 210. The restriction causes a pressure drop such that the pressure level at the outlet port 210 increases gradually to the pressure level of the fluid at the second inlet port 208 as the spool 228 continues to move toward the first position.

As shown in FIG. 6, the pin 300 begins to engage with the blind hole 304 which is filled with fluid. As the spool 228 continues the shift or movement toward the first position, the pin 300 squeezes fluid out of the blind hole 304. The interaction between the fluid in the blind hole 304 and the pin 300 slows down the spool 228 as the spool 228 moves toward the first position. In other words, the pin 300 gradually, longitudinally engages with the blind hole 304 and fluid is squeezed out from the blind hole 304 about an exterior peripheral surface of the pin 300.

Such gradual engagement between the pin 300 and the blind hole 304 and the slowed-down motion of the spool 228 cause the distance "d" to increase at a slower rate compared to the configuration of FIG. 2. Therefore, as the exposed portion of the annular area 218 increases, the pressure level at the outlet port 210 increases gradually, rather than spiking in a short period of time. As a result, a shock wave might not be generated and damage to the components downstream from the outlet port 210 may be precluded.

The spool 228 continues its axial movement within the cage 212 until it seats or sits on the first end cap 214 reaching the first position. FIG. 7 illustrates the valve 200 with the spool 228 at the first position, in accordance with an example implementation. As shown in FIG. 7, the spool 228 has completed its shift from the second position to the first position. The first inlet port 206 is thus blocked, while fluid received at the second inlet port 208 is allowed to flow through the annular area 218 to the outlet port 210. As indicated in FIG. 7, the distance "d" has increased to a maximum value, and the pressure level at the outlet port 210 may be substantially equal to (e.g., within a threshold value or percentage such as 2-5% of) the pressure level at the second inlet port 208.

The pin 300 has squeezed the fluid out of the blind hole 304 and is inserted therein. The fluid acts as a viscous damping fluid that slows down motion of the spool 228. The volume of the blind hole 304 determines the volume of fluid that is squeezed out as the pin 300 progresses inside the blind hole 304. Thus, the damping rate may depend on the volume of the blind hole 304.

The damping rate and the extent of slowing down the spool 228 as it shifts may also depend on a clearance between an exterior peripheral surface of the pin 300 and an interior peripheral surface of the blind hole 304. The tighter the clearance, the larger the damping rate and resistance, whereas a looser fit between the pin 300 and the blind hole 304 may decrease the damping rate. As an example for illustration, a diametric clearance between the exterior peripheral surface of the pin 300 and the interior peripheral surface of the blind hole 304 may range between 0.010" and 0.050" to adjust the resulting damping rate for a particular application.

Further, the length of the pin 300 relative to the distance travelled by the spool 228 may determine what portion of the spool travel is damped. In other words, if the pin 300 is longer and the bind hole 304 is deeper, the pin 300 begins to engage the bind hole 304 earlier in the transition of the spool from the second position to the first position. In examples, the engagement length could span the entire range of motion of the spool 228 as it shifts, or in other examples, the engagement length could be less than the entire range of motion of the spool 228. As an example for illustration, the engagement length may range from between 0.100" and 0.500" to adjust the resulting damping rate for a particular application.

FIGS. 5-7 illustrated shifting the spool 228 from the second position to the first position. When the spool 228 shifts from the first position to the second position, the pin 302 interacts with the blind hole 306 similar to the interaction between the pin 300 and the blind hole 304 described above with respect to FIGS. 5-7.

Figure 8:
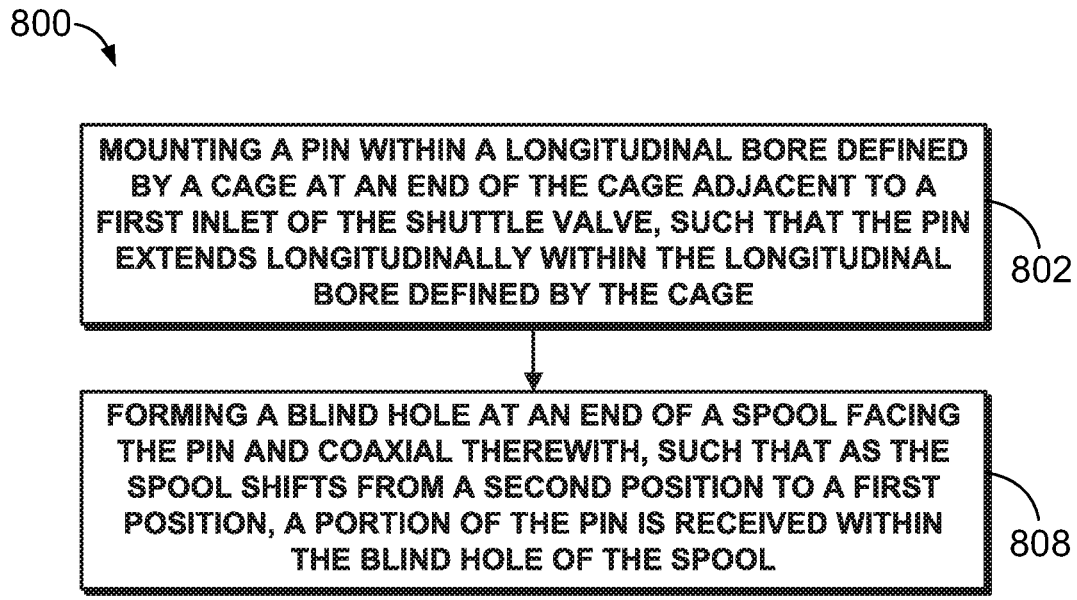
FIG. 8 illustrates a flow chart of a method for damping a shuttle valve, in accordance with an example implementation.

FIG. 8 illustrates a flow chart of a method 800 for damping a shuttle valve, in accordance with an example implementation. The method 800 may include one or more operations, or actions as illustrated by one or more of blocks 802-816. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 802, the method 800 includes mounting a pin within a longitudinal bore defined by a cage at an end of the cage adjacent to a first inlet of the shuttle valve, such that the pin extends longitudinally within the longitudinal bore defined by the cage. As described above with respect to FIGS. 2-7, an example shuttle valve may include a valve body defining a longitudinal bore therein. The valve body may include a first inlet, a second inlet, and an outlet, and the cage is disposed in the longitudinal bore of the valve body coaxial therewith.

Figure 9:
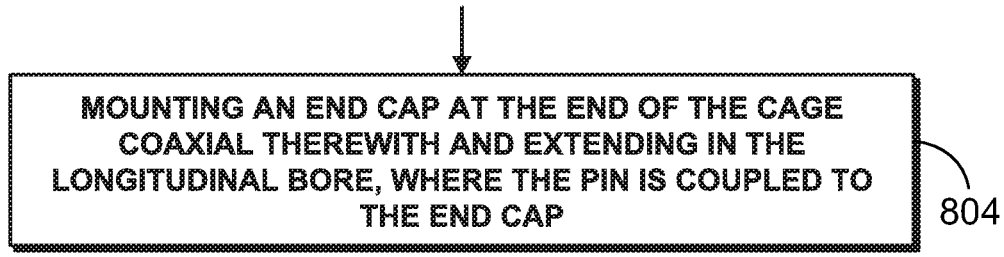
FIG. 9 is a flowchart of a method for use with the method of FIG. 8, in accordance with an example implementation.

The cage may define a longitudinal bore therein. A pin (e.g., the pin 300) may be disposed at the end of the cage that is adjacent to the first inlet. FIG. 9 is a flowchart of a method for use with the method 800, in accordance with an example implementation. At block 804, the method includes mounting an end cap at the end of the cage coaxial therewith and extending in the longitudinal bore, where the pin is coupled to the end cap. In an example, the pin may be coupled or attached to, or made integral with, the end cap. In other examples, the pin may be coupled to or made integral with other components of the valve (e.g., the cage).

Figure 10:
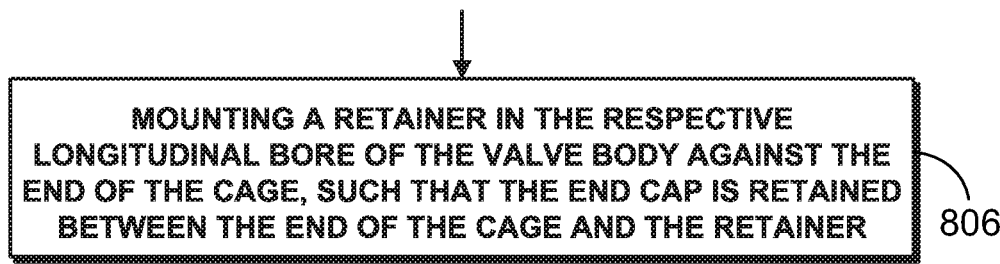
FIG. 10 is a flowchart of a method for use with the method of FIG. 8, in accordance with an example implementation.

FIG. 10 is a flowchart of a method for use with the method 800, in accordance with an example implementation. At block 806, the method includes mounting a retainer in the respective longitudinal bore of the valve body against the end of the cage, such that the end cap is retained between the end of the cage and the retainer. As shown in FIGS. 2-7, a retainer (the retainer 204) may be disposed at an end of the valve body and the first inlet may be formed in the retainer. The end cap may be secured between the retainer and the cage.

Referring back to FIG. 8, at block 808, the method 800 includes forming a blind hole at an end of the spool facing the pin and coaxial therewith, such that as the spool shifts from the second position to the first position, a portion of the pin is received within the blind hole of the spool. A blind hole such as the blind hole 304 may be formed by any manufacturing technique in the spool (e.g., the spool 228). The blind hole is configured to receive therein the pin mounted in the longitudinal bore of the cage. As the spool shifts toward the first inlet, the pin engages gradually with the blind hole, thereby squeezing fluid in the blind hole and slowing down the spool. As a result, the motion of the spool is damped.

The pin and blind hole may be used to damp motion of the spool when the spool shifts from the second position to the first position. Another pin and another blind hole may be used to damp motion of the spool as it shifts back from the first position to the second position.

Figure 11:
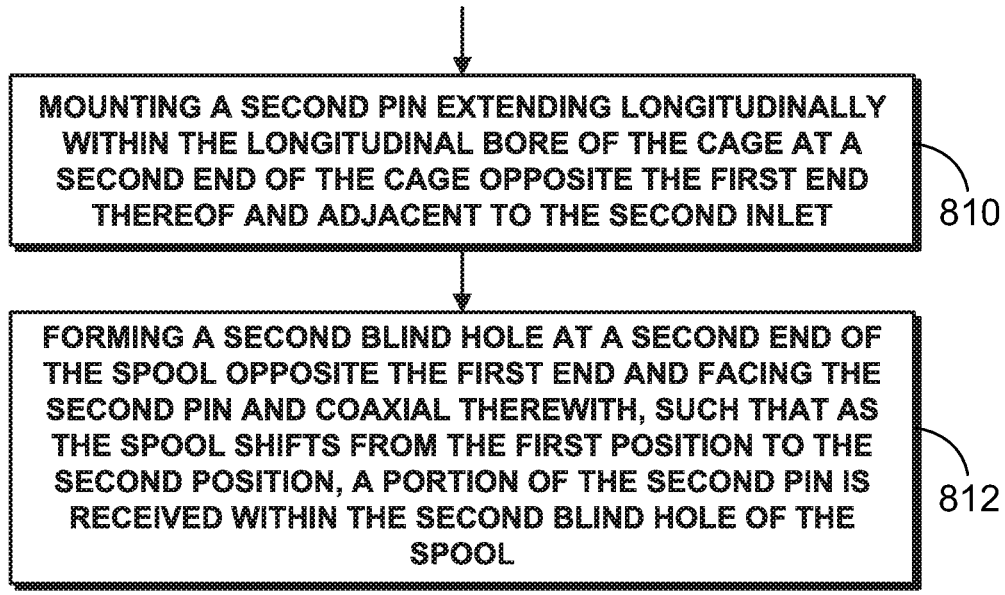
FIG. 11 is a flowchart of a method for use with the method of FIG. 8, in accordance with an example implementation.

FIG. 11 is a flowchart of a method for use with the method 800, in accordance with an example implementation. At block 810, the method includes mounting a second pin extending longitudinally within the longitudinal bore of the cage at a second end of the cage opposite the first end thereof and adjacent to the second inlet. At block 812, the method includes forming a second blind hole at a second end of the spool opposite the first end and facing the second pin and coaxial therewith, such that as the spool shifts from the first position to the second position, a portion of the second pin is received within the second blind hole of the spool. The second pin and the second blind hole interact to damp motion of the spool as it shifts from the first position to the second position.

Figure 12:
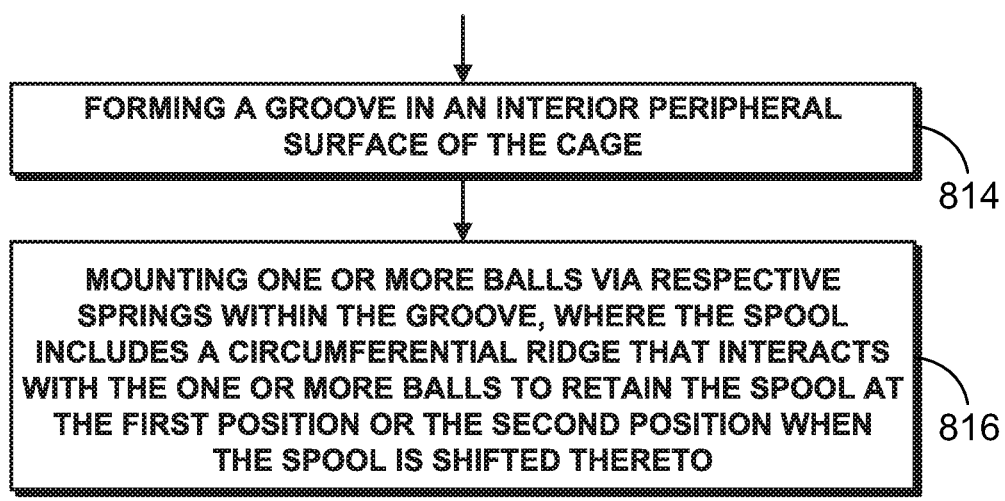
FIG. 12 is a flowchart of a method for use with the method of FIG. 8, in accordance with an example implementation.

FIG. 12 is a flowchart of a method for use with the method 800, in accordance with an example implementation. At block 814, the method includes forming a groove in an interior peripheral surface of the cage, and at block 816 the method includes mounting one or more balls via respective springs within the groove, where the spool includes a circumferential ridge that interacts with the one or more balls to retain the spool at the first position or the second position when the spool is shifted thereto. As shown and described with respect to FIGS. 2-7, the spool may include a ridge that interacts with spring-loaded balls disposed in a groove formed in an interior peripheral surface of the cage. Interaction between the ridge and the spring loaded balls retain the spool at either the first position or the second until a fluid pressure difference between the first and second inlets is sufficient (e.g., 30-40 psi) to overcome the spring forces on the balls, and the spool shifts.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A shuttle valve comprising:
   a valve body defining a first longitudinal bore therein, wherein the valve body comprises a first inlet, a second inlet, and an outlet;
   a cage disposed in the first longitudinal bore, wherein the cage defines a second longitudinal bore therein;
   an end cap fixedly mounted to an end of the cage and extending in the second longitudinal bore, wherein the end cap comprises a blind hole;
   a spool shiftably mounted within the second longitudinal bore and configured to move axially therein to shift between: (i) a first position adjacent to the first inlet, wherein at the first position the spool blocks the first inlet while allowing pressurized fluid to flow from the second inlet to the outlet, and (ii) a second position adjacent to the second inlet, wherein at the second position the spool blocks the second inlet while allowing pressurized fluid to flow from the first inlet to the outlet; and
   a pin coupled to the spool facing the blind hole of the end cap, such that as the spool shifts from the second position to the first position, the spool and the pin coupled thereto move axially toward the end cap and a portion of the pin is received within the blind hole of the end cap, such that the portion of the pin fills the blind hole when the spool is in the first position.

2. The shuttle valve of claim 1, wherein the second inlet is coaxial with, and mounted opposite to, the first inlet, and wherein the outlet is disposed transverse to the first and second inlets.

3. The shuttle valve of claim 1, wherein the valve body further comprises a port fluidly coupled to the first inlet via an orifice, and wherein the port is configured to receive a pressure sensor.

4. The shuttle valve of claim 1, further comprising:
   a retainer mounted in the first longitudinal bore of the valve body and secured against the end of the cage, such that the end cap is retained between the end of the cage and the retainer, wherein the first inlet is formed in the retainer whereas the second inlet is formed in the valve body, and wherein the retainer is configured as a separate component from the end cap.

5. The shuttle valve of claim 1, wherein the pin is a first pin, the end cap is a first end cap, and the blind hole is a first blind hole, wherein the end of the cage is a first end of the cage, and wherein the first pin is coupled to a first end of the spool, and wherein the shuttle valve further comprises:
   a second end cap fixedly mounted to a second end of the cage and extending in the second longitudinal bore, wherein the second end cap comprises a second blind hole; and
   a second pin coupled to a second end of the spool facing the second blind hole of the second end cap, such that as the spool shifts from the first position to the second position, the spool and the second pin coupled thereto move axially toward the second end cap and a respective portion of the second pin is received within the second blind hole of the second end cap.

6. The shuttle valve of claim 1, wherein the end cap comprises a plurality of holes disposed in an array about a center of the end cap to allow fluid flow through the end cap.

7. The shuttle valve of claim 1, wherein the pin is cylindrical and the blind hole is a cylindrical hole, and wherein an outer diameter of the pin is smaller than an inner diameter of the blind hole.

8. The shuttle valve of claim 1, wherein the outlet is fluidly coupled to an annular area formed between an exterior peripheral surface of the cage and an interior peripheral surface of the valve body, wherein when the spool shifts to the first position, the spool allows pressurized fluid to flow from the second inlet to the outlet via the annular area, and wherein when the spool shifts to the second position, the spool allows pressurized fluid to flow from the first inlet to the outlet via the annular area.

9. A valve comprising:
   a valve body defining a first longitudinal bore therein, wherein the valve body comprises a first inlet, a second inlet, and an outlet;
   a cage disposed in the first longitudinal bore coaxial with the valve body, wherein the cage defines a second longitudinal bore therein;
   a first end cap fixedly mounted to a first end of the cage and extending in the second longitudinal bore, wherein the first end cap comprises a first blind hole;
   a second end cap fixedly mounted to a second end of the cage and extending in the second longitudinal bore, wherein the second end cap comprises a second blind hole;
   a spool shiftably mounted within the second longitudinal bore and configured to move axially therein to shift between: (i) a first position adjacent to the first inlet, wherein at the first position the spool blocks the first inlet while allowing pressurized fluid to flow from the second inlet to the outlet, and (ii) a second position adjacent to the second inlet, wherein at the second position the spool blocks the second inlet while allowing pressurized fluid to flow from the first inlet to the outlet;
   a first pin coupled to a first end of the spool facing the first blind hole of the first end cap, such that as the spool shifts from the second position to the first position, the spool and the first pin coupled thereto move axially toward the first end cap and a portion of the first pin is received within the first blind hole of the first end cap, such that the portion of the first pin fills the first blind hole when the spool is in the first position; and
   a second pin coupled to a second end of the spool facing the second blind hole of the second end cap, such that as the spool shifts from the first position to the second position, the spool and the second pin coupled thereto move axially toward the second end cap and a respective portion of the second pin is received within the second blind hole of the second end cap, such that the respective portion of the second pin fills the second blind hole when the spool is in the second position.

10. The valve of claim 9, wherein the second inlet is coaxial with, and mounted opposite to, the first inlet, and wherein the outlet is disposed transverse to the first and second inlets.

11. The valve of claim 9, wherein the spool is seated on the first end cap when shifted to the first position, and wherein the spool is seated on the second end cap when shifted to the second position.

12. The valve of claim 9, further comprising:
a retainer mounted in the first longitudinal bore of the valve body and secured against the first end of the cage, such that the first end cap is retained between the first end of the cage and the retainer, wherein the first inlet is formed in the retainer.

13. The valve of claim 9, wherein the first pin is cylindrical and the first blind hole is a cylindrical hole, and wherein an outer diameter of the first pin is smaller than an inner diameter of the first blind hole.

14. The valve of claim 9, wherein the first inlet is fluidly coupled to a first source of pressurized fluid, and the second inlet is fluidly coupled to a second source of pressurized fluid.

15. The valve of claim 9, further comprising:
one or more balls mounted via respective springs in a groove disposed in an interior peripheral surface of the cage, wherein the spool includes a circumferential ridge that interacts with the one or more balls to retain the spool at the first position or the second position when the spool is shifted thereto.

16. A method for damping a shuttle valve, the method comprising:
mounting a pin to a spool of the shuttle valve, wherein the shuttle valve comprises:
a valve body defining a first longitudinal bore therein, wherein the valve body comprises a first inlet, a second inlet, and an outlet,
a cage disposed in the first longitudinal bore coaxial with the valve body, wherein the cage defines a second longitudinal bore therein, and
an end cap fixedly mounted to an end of the cage and extending in the second longitudinal bore; and
forming a blind hole in the end cap, such that the pin of the spool faces the blind hole, wherein the spool is shiftably mounted within the second longitudinal bore and configured to move axially therein to shift between:
(i) a first position adjacent to the first inlet, wherein at the first position the spool blocks the first inlet while allowing pressurized fluid to flow from the second inlet to the outlet, and (ii) a second position adjacent to the second inlet, wherein at the second position the spool blocks the second inlet while allowing pressurized fluid to flow from the first inlet to the outlet, and wherein, as the spool shifts from the second position to the first position, the spool and the pin coupled thereto move axially toward the end cap and a portion of the pin is received within the blind hole of the end cap, such that the portion of the pin fills the blind hole when the spool is in the first position.

17. The method of claim 16, wherein the pin is a first pin, the end cap is a first end cap, and the blind hole is a first blind hole, wherein the end of the cage is a first end of the cage, wherein the first pin is mounted to a first end of the spool, where the shuttle valve further comprises a second end cap fixedly mounted to a second end of the cage and extending in the second longitudinal bore, and wherein the method further comprises:
mounting a second pin to a second end of the spool; and
forming a second blind hole in the second end cap, such that the second pin of the spool faces the second blind hole, wherein, as the spool shifts from the first position to the second position, the spool and the second pin mounted thereto move axially toward the second end cap and a respective portion of the second pin is received within the second blind hole of the second end cap.

18. The method of claim 16, further comprising:
mounting a retainer in the respective longitudinal bore of the valve body against the end of the cage, such that the end cap is retained between the end of the cage and the retainer.

19. The method of claim 16, further comprising:
forming a groove in an interior peripheral surface of the cage; and
mounting one or more balls via respective springs within the groove, wherein the spool includes a circumferential ridge that interacts with the one or more balls to retain the spool at the first position or the second position when the spool is shifted thereto.

20. The method of claim 16, wherein forming the blind hole comprises forming the blind hole as a cylindrical hole, wherein the pin is cylindrical, and wherein an outer diameter of the pin is smaller than an inner diameter of the cylindrical hole.

* * * * *